US011213860B2

(12) United States Patent
Shi

(10) Patent No.: US 11,213,860 B2
(45) Date of Patent: Jan. 4, 2022

(54) AUTOMATIC MAGNETIC CORE SORTING SYSTEM BASED ON MACHINE VISION

(71) Applicant: Xiangnong Intelligent Technologies Co., Ltd., Jiangsu (CN)

(72) Inventor: Xiaoming Shi, Jiangsu (CN)

(73) Assignee: Xiangnong Intelligent Technologies Co., Ltd., Suzhou (CN)

( * ) Notice: Subject to any disclaimer, the term of this patent is extended or adjusted under 35 U.S.C. 154(b) by 239 days.

(21) Appl. No.: 16/425,966

(22) Filed: May 30, 2019

(65) Prior Publication Data

US 2019/0388940 A1   Dec. 26, 2019

(30) Foreign Application Priority Data

Apr. 23, 2018   (CN) .......................... 201810367485.6

(51) Int. Cl.
  *B07C 5/342*   (2006.01)
  *B07C 5/02*   (2006.01)
  *G06T 7/00*   (2017.01)
  *G06T 7/55*   (2017.01)

(52) U.S. Cl.
  CPC ............ *B07C 5/342* (2013.01); *B07C 5/02* (2013.01); *G06T 7/001* (2013.01); *G06T 7/55* (2017.01); *B07C 2501/0063* (2013.01); *G05B 2219/32222* (2013.01); *G06T 2207/30164* (2013.01)

(58) Field of Classification Search
  CPC ............. G06T 7/001; G06T 7/55; B07C 5/02
  USPC .................................... 209/47, 552, 562, 577
  See application file for complete search history.

(56) References Cited

U.S. PATENT DOCUMENTS

| 5,291,645 A | * | 3/1994 | Aoyama | ............... B23P 19/006 29/240 |
| 2002/0002418 A1 | * | 1/2002 | Pratt | .................. B23K 26/0861 700/166 |
| 2004/0197020 A1 | * | 10/2004 | Sones | ..................... G06T 7/001 382/162 |
| 2006/0140471 A1 | * | 6/2006 | Murakami | .............. G06T 7/001 382/145 |
| 2015/0290683 A1 | * | 10/2015 | Kujacznski | ............ G01N 21/89 209/587 |

(Continued)

*Primary Examiner* — Charles A Fox
*Assistant Examiner* — Michael E Butler
(74) *Attorney, Agent, or Firm* — JCIP Global Inc.

(57) ABSTRACT

This invention discloses an automatic magnetic core sorting system based on machine vision, which comprises an image acquisition and detection mechanism, a digital conversion module, an image processing module, and a workpiece sorting mechanism. The digital conversion module communicates with the image acquisition and detection mechanism. The image processing module receives the digital signals of images of each workpiece taken from various angles and compares the digital signals with a preset value. Afterwards, the results of comparison are sent to the central control module which judges and controls the operations of the workpiece sorting mechanism according to the results sent from the image processing module. This invention adopts the machine vision-based automatic identification technology to automatically identify color and appearance defects of magnetic sheets on conveyor line. With advantages of real-time and accurate detection with high precision, it greatly improves the efficiency and the degree of automation of production.

7 Claims, 6 Drawing Sheets

(56) References Cited

U.S. PATENT DOCUMENTS

| | | | |
|---|---|---|---|
| 2015/0290805 A1* | 10/2015 | Morency | B25J 9/1679 |
| | | | 700/99 |
| 2015/0377796 A1* | 12/2015 | Schlezinger | G01R 31/2648 |
| | | | 356/72 |
| 2016/0231253 A1* | 8/2016 | Nygaard | G06T 7/0004 |
| 2016/0379351 A1* | 12/2016 | Michael | G06T 7/344 |
| | | | 348/46 |
| 2018/0005365 A1* | 1/2018 | Kimura | B25J 9/0087 |
| 2019/0071261 A1* | 3/2019 | Wertenberger | B25J 15/0052 |
| 2020/0360968 A1* | 11/2020 | Nygaard | G06T 7/001 |

* cited by examiner

AUTOMATIC MAGNETIC CORE SORTING SYSTEM BASED ON MACHINE VISION

CROSS REFERENCE TO RELATED APPLICATIONS

The present application claims the benefit of Chinese Patent Application No. 201810367485.6 filed on Apr. 23, 2018, the contents of which are incorporated herein by reference in its entirety.

FIELD OF THE INVENTION

This invention relates to an automatic magnetic core sorting system based on machine vision.

BACKGROUND OF THE INVENTION

With the rapid development of electronic and computer technologies, digital image processing technology has been widely used in many industries and fields, such as medical image processing and analysis, industrial control and detection automation, and aerospace remote sensing and mapping because of its advantages of large information content, intuitive form of expression, convenient transmission and storage. With the improvement of economy level in China, the demands for products with high quality, precision and reliability are also increasingly growing. A problem followed by that is that the manual testing requires a high labor intensity, which is limited by many factors such as worker's mental state, proficiency, experience and working environment. As a result, the testing is inefficient and slow, and the tested devices can hardly meet the consistency standard. Errors and omissions inevitably occur due to the fatigue of workers in the testing process. The outflow of unqualified products not only brings economic losses to factories, but also induces potential safety hazards to users. Therefore, how to detect the surface defects of parts in a quick, efficient and accurate way has been an urgent problem to be solved in the manufacturing industry.

SUMMARY OF THE INVENTION

The main technical problem solved by this invention is to provide an automatic magnetic core sorting system based on machine vision, which adopts the machine vision-based automatic identification technology to automatically identify color and appearance defects of magnetic sheets on conveyor line. With advantages of real-time and accurate detection with high precision, it greatly improves the efficiency and the degree of automation of production.

A technical solution adopted by the invention is that: an automatic magnetic core sorting system based on machine vision comprises an image acquisition and detection mechanism, a digital conversion module, an image processing module, a central control module and a workpiece sorting mechanism;

The image acquisition and detection mechanism comprises a visual device, which, in a real-time manner, acquires the signals of images taken from various angles of each workpiece that is conveyed on the conveyor belt, and then transmit those signals to the digital conversion module;

The digital conversion module communicates with the image acquisition and detection mechanism to receive the signals of images of each workpiece taken from various angles via the image acquisition and detection mechanism in real time. Then, based on pixel distribution, brightness and color information, the digital conversion module converts those signals into digital signals corresponding to each angle of each workpiece, and transmits them to the image processing module;

The image processing module is connected with the digital conversion module. With the digital signals of images of each workpiece taken from various angles received, the digital signals are compared with a preset value, and the comparison results are sent to the central control module;

The central control module judges and controls the operations of the workpiece sorting mechanism according to the comparison results sent from the image processing module, and manipulates the workpiece sorting mechanism to pick out any defective workpiece conveyed on the conveyor belt.

In a preferred embodiment of the invention, the preset value comparison procedures in the image processing module are as follows:

After acquiring the digital signals of images of each workpiece taken from various angles, the image processing module compares them with the stored digital signals of defective workpiece images;

If the comparison result is abnormal, the workpiece is judged as abnormal.

In a preferred embodiment of the invention, the image acquisition and detection mechanism also comprises a conveyor belt for placing workpieces to be sorted and conveying them to an image acquisition station of the vision device.

In a preferred embodiment of the invention, the conveyor belt is provided with a turnover mechanism in the middle for turning workpieces over.

In a preferred embodiment of the invention, the workpiece sorting mechanism comprises a driving device and a waste bin which are symmetrically arranged on both sides of the conveyor belt. The driving device comprises a bracket fixed at the edge of the conveyor belt, a driving cylinder arranged above the bracket, and a nylon block arranged at the front end of the driving cylinder for pushing defective workpieces into the waste bin.

In a preferred embodiment of the invention, the vision device is arranged in a darkroom and comprises a plurality of camera devices aiming at workpieces on the conveyor belt.

In a preferred embodiment of the invention, a walking robot is arranged on a side of the conveyor belt and moves to and fro in a direction parallel to the conveyor belt.

In a preferred embodiment of the invention, the vision device is a camera device arranged on the walking robot and is installed at the end of the robot arm by a clamp.

In a preferred embodiment of the invention, the camera device comprises a camera, a lens and a light source.

In a preferred embodiment of the invention, the central control module is a PLC controller.

This invention discloses an automatic magnetic core sorting system which adopts machine vision-based automatic identification technology to renovate the production line for automation. On the conveyor line, both color and appearance defects of magnetic sheets are automatically detected, with advantages of real-time and accurate detection and high precision. It shortens the production cycle of products, greatly improves the efficiency and the degree of automation of production, and enhances the utilization rate of equipment and the labor productivity of employees.

DETAILED DESCRIPTION

Figure 1:
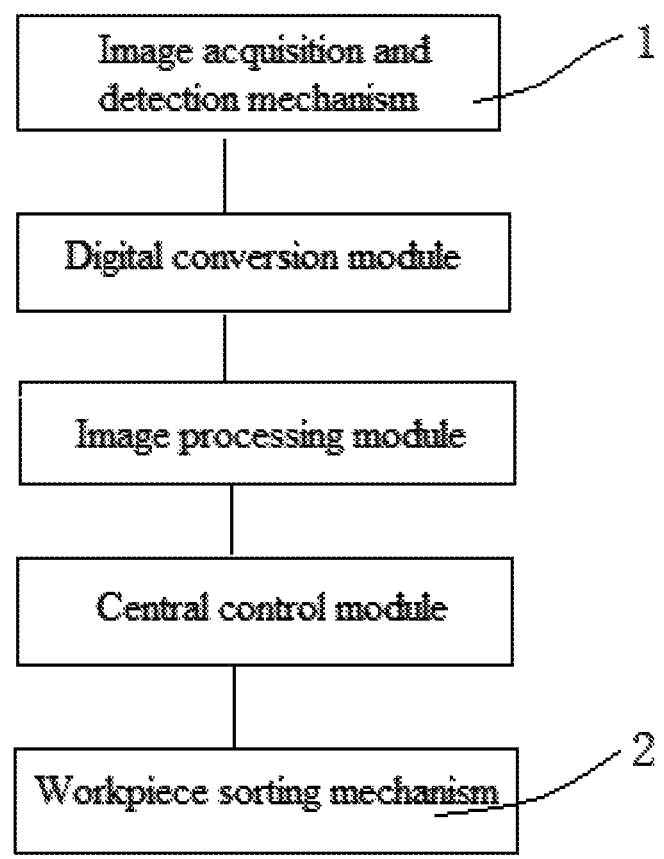
FIG. 1 shows a structural block diagram of the automatic magnetic core sorting system based on machine vision.
Figure 2:
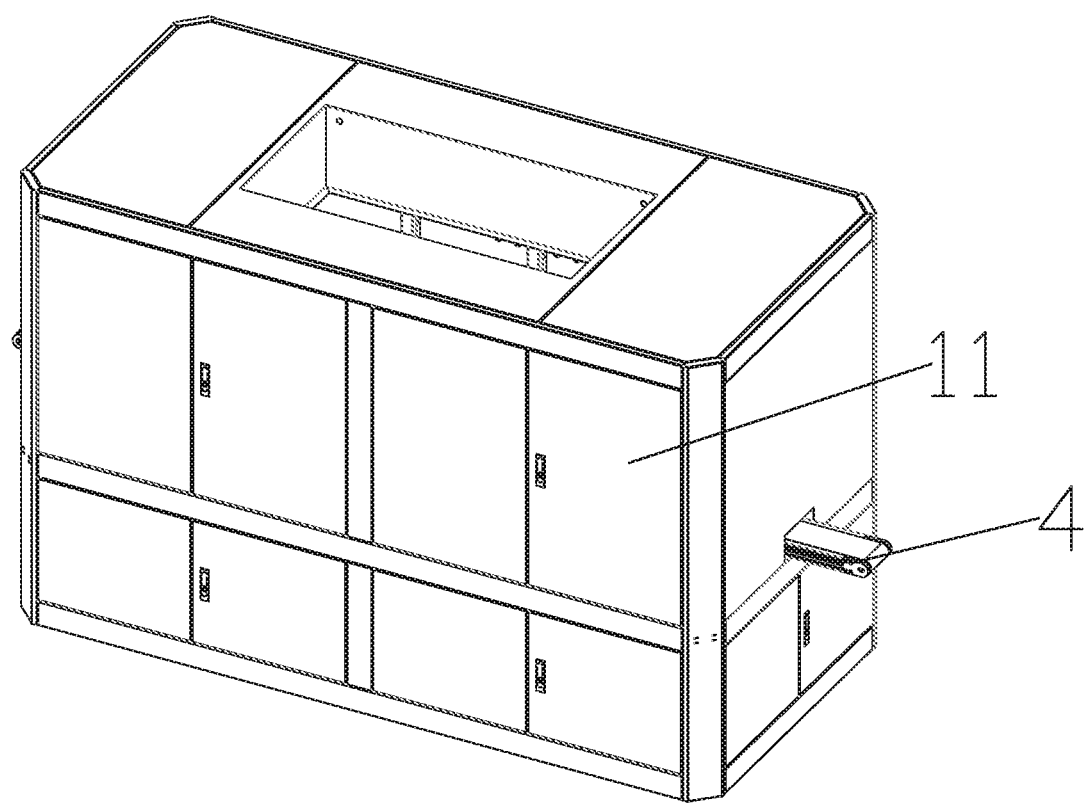
FIG. 2 shows a schematic external structure drawing of the automatic magnetic core sorting system based on machine vision.
Figure 3:
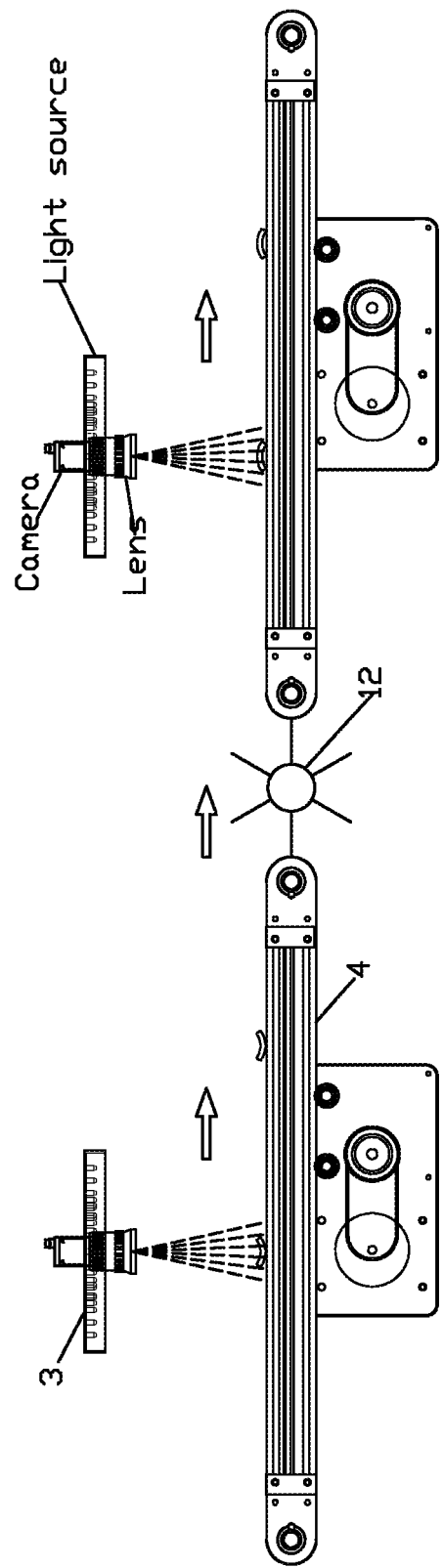
FIG. 3 shows a schematic structure drawing of the automatic magnetic core sorting system based on machine vision.
Figure 4:
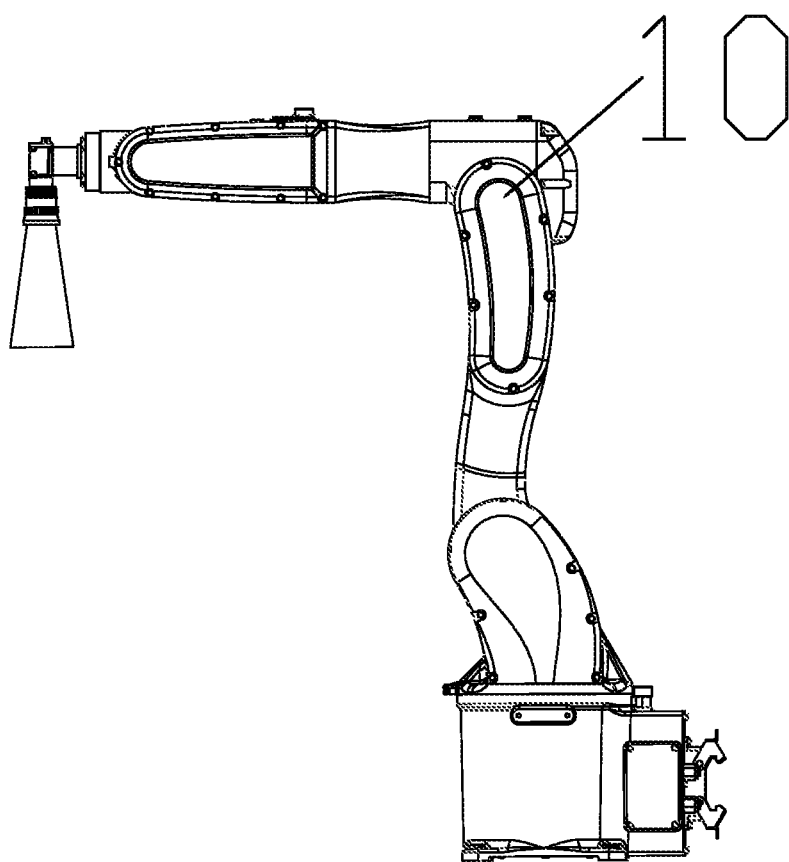
FIG. 4 shows a schematic structure drawing of the walking robot in a preferred embodiment of the automatic magnetic core sorting system based on machine vision.
Figure 5:
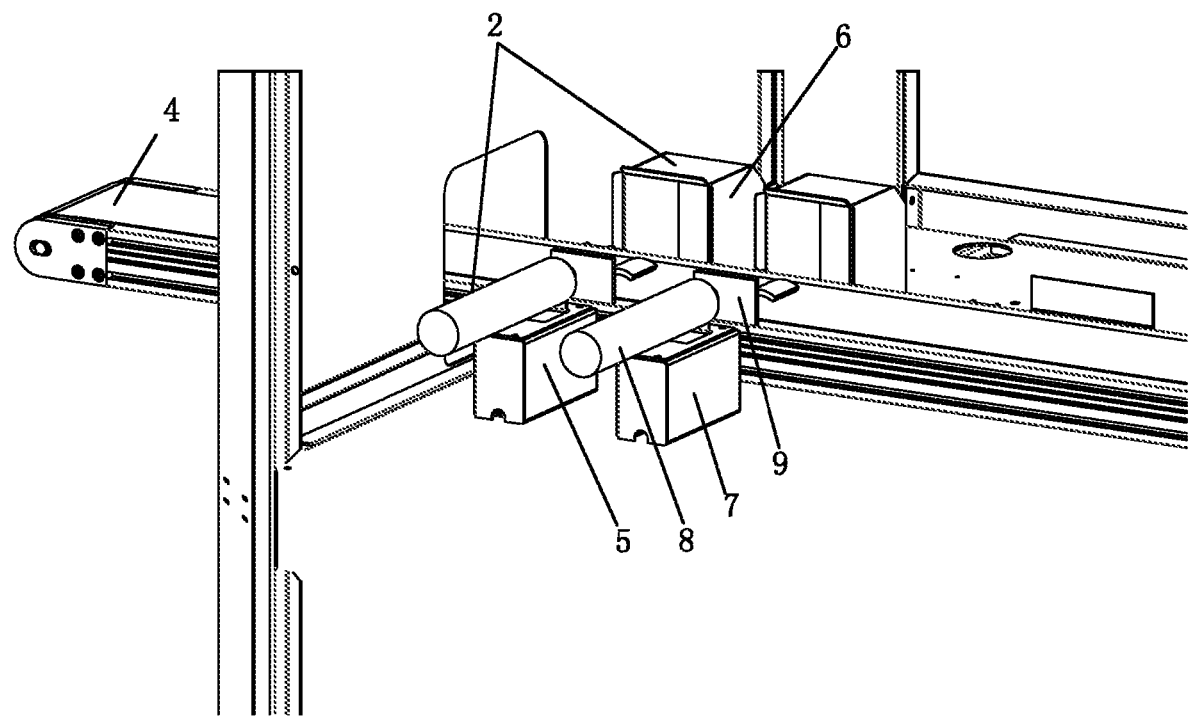
FIG. 5 shows a schematic structure drawing of the sorting mechanism in a preferred embodiment of the automatic magnetic core sorting system based on machine vision.

Preferred embodiments of the invention are described in details as follows so that those of ordinary skill in the art can understand the advantages and characteristics of the invention more easily, and thus the protection scope of the invention can be defined more clearly.

By referring to FIGS. 1-6, the embodiments of the invention include:

This invention discloses an automatic magnetic core sorting system based on machine vision, which comprises an image acquisition and detection mechanism 1, a digital conversion module, an image processing module, a central control module, and a workpiece sorting mechanism 2. The image acquisition and detection mechanism 1 comprises a visual device 3, which, in a real-time manner, acquires the signals of images taken from various angles of each workpiece that is conveyed on the conveyor belt 4, and then transmits those signals to the digital conversion module. The digital conversion module communicates with the image acquisition and detection mechanism 1 to receive the signals of images of each workpiece taken from various angles via the image acquisition and detection mechanism 1 in real time. Then, based on pixel distribution, brightness and color information, the digital conversion module converts those signals into digital signals corresponding to each angle of each workpiece, and transmits them to the image processing module. The image processing module is connected with the digital conversion module. With the digital signals of images of each workpiece taken from various angles received, the digital signals are compared with a preset value, and the comparison results are sent to the central control module. The central control module judges and controls the operations of the workpiece sorting mechanism 2 according to the comparison results sent from the image processing module, and manipulates the workpiece sorting mechanism 2 to pick out any defective workpiece conveyed on the conveyor belt.

Further, the preset value comparison procedures in the image processing module are as follows: after acquiring the digital signals of images of each workpiece taken from various angles, the image processing module compares them with the stored digital signals of defective workpiece images. If the similarity in comparison is less than the preset value (preferably 99.5%), the workpiece is judged as defective, at which time the central control module sends out instructions to control the workpiece sorting mechanism 2 to pick out defective workpieces. It should be noted that the stored digital signals of defective workpiece images are consisted of: pre-collected digital signals of workpiece surface images with the color falling in the preset chroma range/preset brightness range, qualified shape and qualified pixel distribution.

Further, the workpiece sorting mechanism 2 comprises a driving device 5 and a waste bin 6 which are symmetrically arranged on both sides of the conveyor belt 4. The driving device 5 comprises a bracket 7 fixed at the edge of the conveyor belt 4, a driving cylinder 8 arranged above the bracket 7, and a nylon block 9 arranged at the front end of the driving cylinder 8 for pushing defective workpieces into the waste bin.

Further, the conveyor belt 4 is used for placing workpieces to be sorted and conveying them to an image acquisition station of the vision device. The conveyor belt 4 is provided with a turnover mechanism 12 in the middle for turning workpieces over to collect the images of the front, back and other sides of a workpiece.

Preferably, the vision device is arranged in a darkroom 11 and comprises a plurality of camera devices aiming at workpieces on the conveyor belt 4, which can take pictures of workpieces from various angles without blind angle.

Preferably, the vision device is a walking robot 10 arranged on a side of the conveyor belt 4. A CCD industrial camera is mounted at the end of the robot arm. The walking robot 10 moves to and fro in a direction parallel to the conveyor belt, so that the image of each surface of a workpiece can be acquired for accurate defect detection at micron level.

Figure 6:
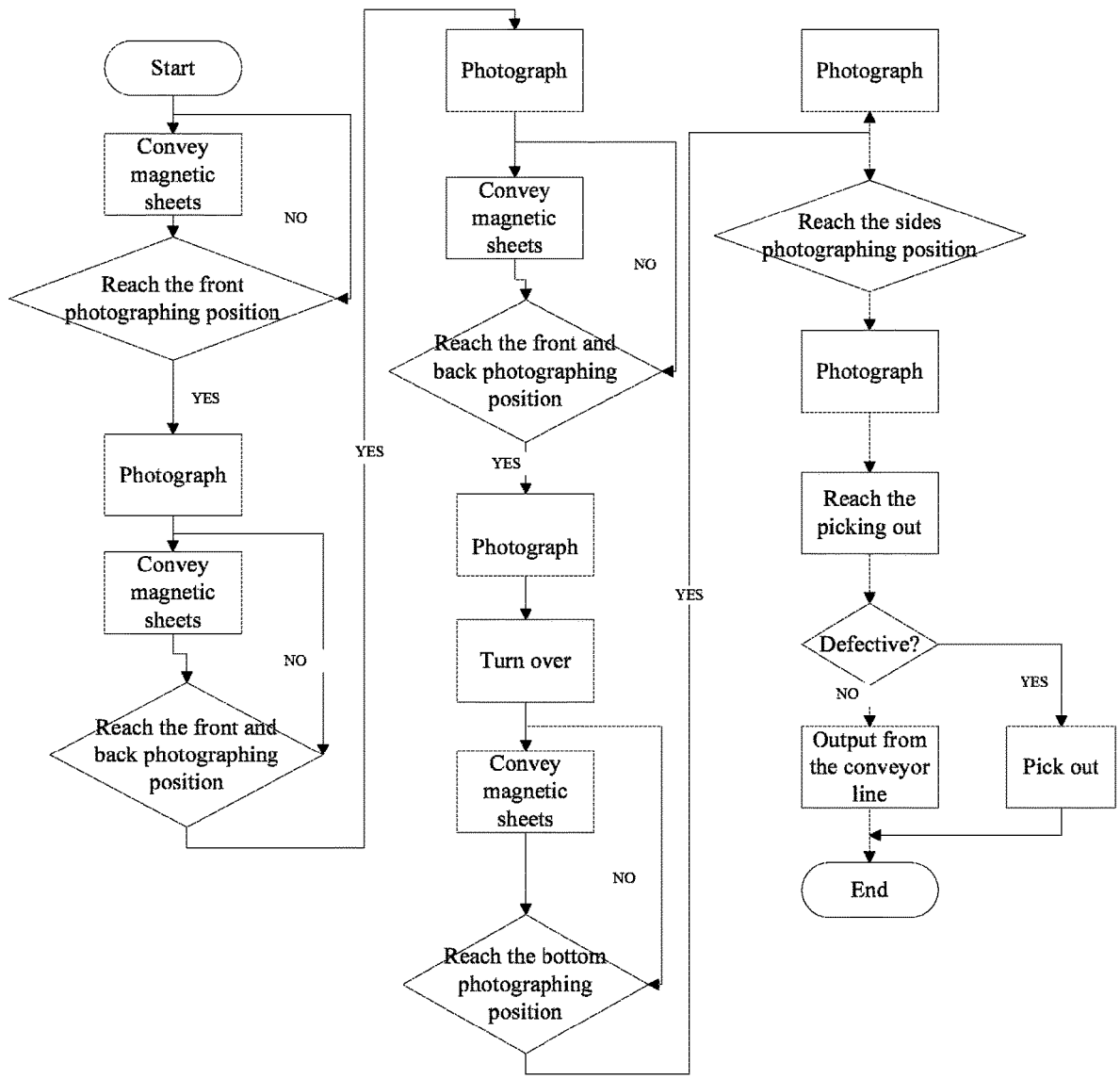
FIG. 6 shows a flow diagram of the automatic magnetic core sorting system based on machine vision.

Workflow: as shown in FIG. 6, the magnetic sheets are firstly placed on the conveyor belt and move in a row along with the conveyor belt. When a workpiece reaches the front photographing position, the upper surface image of the workpiece is acquired by an industrial digital camera. Then the magnetic sheet is conveyed to the sides photographing position to acquire the images of upper, lower, left and right sides. The bottom surface image of the workpiece can be acquired by the industrial digital camera after using the turnover mechanism to turn the workpiece is over. Afterwards, the images are processed in the image processing module and the central control module to identify and judge whether the magnetic sheet is defective and has to be picked out and whether the dimensions are qualified. Then the preset sorting control signal is sent to the sorting mechanism to control the front end of the driving cylinder, which drives the nylon block to push the unqualified workpiece into the waste bin so as to realize accurate and reliable sorting of workpieces.

This invention discloses an automatic magnetic core sorting system which adopts machine vision-based automatic identification technology to automatically identify color and appearance defects of magnetic sheets on conveyor line. With advantages of real-time and accurate detection, high detection precision, high flexibility and high degree of automation, it shortens the production cycle of products and greatly improves the efficiency of production.

The preceding parts are only embodiments of the invention, but the protection scope of the invention is not limited thereto. In the technical field disclosed by the invention, any change or substitution made by those of ordinary skill in the art without contributing creative labor shall be covered in the protection scope of the invention. Therefore, the protection scope of the invention should be based on the protection scope defined by the claims.

What is claimed is:

1. An automatic magnetic core sorting system based on machine vision, comprising an image acquisition and detection mechanism, a digital conversion module, an image processing module, a central control module and a workpiece sorting mechanism;

wherein the image acquisition and detection mechanism comprises a visual device having an image acquisition station, and a conveyor belt for placing workpieces to be sorted and conveying the workpieces to be sorted to the image acquisition station of the vision device, the visual device, in a real-time manner, acquires signals of images taken from various angles of each workpiece that is conveyed on the conveyor belt, and then transmit the signals to the digital conversion module;

the digital conversion module communicates with the image acquisition and detection mechanism to receive the signals of images of each workpiece taken from various angles via the image acquisition and detection mechanism in real time;

then, based on pixel distribution, brightness and color information, the digital conversion module converts the signals into digital signals corresponding to each angle of each workpiece, and transmits the digital signals to the image processing module;

the image processing module is connected with the digital conversion module; with the digital signals of images of each workpiece taken from various angles received, the digital signals are compared with a preset value, and the comparison results are sent to the central control module, wherein the image processing module compares the received digital signals with stored digital signals of corresponding workpiece images, and when a similarity in comparison is less than the preset value, the workpiece is judged as defective, the stored digital signals are consisted of: pre-collected digital signals of workpiece surface images with a color falling in a preset chroma range/preset brightness range, qualified shape and qualified pixel distribution;

the central control module judges and controls the operations of the workpiece sorting mechanism according to the comparison results sent from the image processing module, and manipulates the workpiece sorting mechanism to pick out any defective workpiece conveyed on the conveyor belt;

wherein the workpiece sorting mechanism comprises a driving device and a waste bin which are symmetrically arranged on both sides of the conveyor belt; the driving device comprises a bracket fixed at the edge of the conveyor belt, a driving cylinder arranged above the bracket, and a nylon block arranged at the front end of the driving cylinder for pushing defective workpieces into the waste bin.

2. The automatic magnetic core sorting system based on machine vision as described in claim 1, wherein the conveyor belt is provided with a turnover mechanism in the middle for turning workpieces over.

3. An automatic magnetic core sorting system based on machine vision, comprising an image acquisition and detection mechanism, a digital conversion module, an image processing module, a central control module and a workpiece sorting mechanism;

wherein the image acquisition and detection mechanism comprises a visual device having an image acquisition station, and a conveyor belt for placing workpieces to be sorted and conveying the workpieces to be sorted to the image acquisition station of the vision device, the visual device, in a real-time manner, acquires signals of images taken from various angles of each workpiece that is conveyed on the conveyor belt, and then transmit the signals to the digital conversion module;

the digital conversion module communicates with the image acquisition and detection mechanism to receive the signals of images of each workpiece taken from various angles via the image acquisition and detection mechanism in real time;

then, based on pixel distribution, brightness and color information, the digital conversion module converts the signals into digital signals corresponding to each angle of each workpiece, and transmits the digital signals to the image processing module;

the image processing module is connected with the digital conversion module; with the digital signals of images of each workpiece taken from various angles received, the digital signals are compared with a preset value, and the comparison results are sent to the central control module, wherein the image processing module compares the received digital signals with stored digital signals of corresponding workpiece images, and when a similarity in comparison is less than the preset value, the workpiece is judged as defective, the stored digital signals are consisted of: pre-collected digital signals of workpiece surface images with a color falling in a preset chroma range/preset brightness range, qualified shape and qualified pixel distribution;

the central control module judges and controls the operations of the workpiece sorting mechanism according to the comparison results sent from the image processing module, and manipulates the workpiece sorting mechanism to pick out any defective workpiece conveyed on the conveyor belt, wherein the vision device is arranged in a darkroom and comprises a plurality of camera devices aiming at workpieces on the conveyor belt.

4. An automatic magnetic core sorting system based on machine vision, comprising an image acquisition and detection mechanism, a digital conversion module, an image processing module, a central control module and a workpiece sorting mechanism;

wherein the image acquisition and detection mechanism comprises a visual device having an image acquisition station, and a conveyor belt for placing workpieces to be sorted and conveying the workpieces to be sorted to the image acquisition station of the vision device, the visual device, in a real-time manner, acquires signals of images taken from various angles of each workpiece that is conveyed on the conveyor belt, and then transmit the signals to the digital conversion module;

the digital conversion module communicates with the image acquisition and detection mechanism to receive the signals of images of each workpiece taken from various angles via the image acquisition and detection mechanism in real time;

then, based on pixel distribution, brightness and color information, the digital conversion module converts the signals into digital signals corresponding to each angle of each workpiece, and transmits the digital signals to the image processing module;

the image processing module is connected with the digital conversion module; with the digital signals of images of each workpiece taken from various angles received, the digital signals are compared with a preset value, and the comparison results are sent to the central control module, wherein the image processing module compares the received digital signals with stored digital signals of corresponding workpiece images, and when a similarity in comparison is less than the preset value, the workpiece is judged as defective, the stored digital signals are consisted of: pre-collected digital signals of workpiece surface images with a color falling in a preset chroma range/preset brightness range, qualified shape and qualified pixel distribution;

the central control module judges and controls the operations of the workpiece sorting mechanism according to the comparison results sent from the image processing module, and manipulates the workpiece sorting mechanism to pick out any defective workpiece conveyed on the conveyor belt, wherein a walking robot is arranged on a side of the conveyor belt and moves to and from in a direction parallel to the conveyor belt; and wherein the vision device is a camera device arranged on the walking robot and is installed at the end of the robot arm by a clamp.

5. The automatic magnetic core sorting system based on machine vision as described in claim 3, wherein each of the plurality of camera devices comprise a camera, a lens and a light source.

6. The automatic magnetic core sorting system based on machine vision as described in claim 1, wherein the central control module is a PLC controller.

7. The automatic magnetic core sorting system based on machine vision as described in claim 4, wherein the camera device comprises a camera, a lens and a light source.

* * * * *